United States Patent
Rehman et al.

(10) Patent No.: US 9,085,221 B2
(45) Date of Patent: Jul. 21, 2015

(54) DECOUPLED LOAD-PATH TO REDUCE THE PELVIS COMBINED LOAD OF A VEHICLE OCCUPANT

(71) Applicant: Ford Global Technologies, LLC, Dearborn, MI (US)

(72) Inventors: Shakeeb Rehman, Rochester Hills, MI (US); Nitesh Chandrakant Jadhav, Canton, MI (US); James Joseph Franko, Saline, MI (US); Maggie Walker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/084,244

(22) Filed: Nov. 19, 2013

(65) Prior Publication Data
US 2015/0137554 A1    May 21, 2015

(51) Int. Cl.
*B60J 5/04*    (2006.01)
(52) U.S. Cl.
CPC ..................... *B60J 5/0412* (2013.01)
(58) Field of Classification Search
CPC ............... B60J 5/0425; B60R 13/0243; B60R 21/0428; F16F 7/121
USPC ............... 49/503; 296/146.7, 187.12, 203.03, 296/146.6, 187.03, 146.5
See application file for complete search history.

(56) References Cited

U.S. PATENT DOCUMENTS

| | | | | |
|---|---|---|---|---|
| 4,272,103 | A * | 6/1981 | Schmid et al. | 280/751 |
| 5,542,738 | A * | 8/1996 | Walker et al. | 296/187.05 |
| 5,603,548 | A * | 2/1997 | Gandhi et al. | 296/146.7 |
| 5,749,600 | A * | 5/1998 | Yamada et al. | 280/751 |
| 5,884,434 | A * | 3/1999 | Dedrich et al. | 49/503 |
| 6,039,387 | A | 3/2000 | Choi | |
| 6,969,110 | B2 * | 11/2005 | Ali et al. | 296/187.12 |
| 7,014,249 | B2 * | 3/2006 | Karuppaswamy et al. | 296/146.6 |
| 7,198,319 | B2 * | 4/2007 | Schroder et al. | 296/146.7 |
| 7,341,277 | B2 | 3/2008 | Huttsell et al. | |
| 7,503,621 | B2 * | 3/2009 | Mani | 296/187.05 |
| 8,123,276 | B2 | 2/2012 | Subbian et al. | |
| 2007/0262612 | A1 | 11/2007 | Cowelchuk et al. | |
| 2010/0201112 | A1 * | 8/2010 | Subbian et al. | 280/784 |
| 2011/0204679 | A1 | 8/2011 | Deng et al. | |
| 2013/0147230 | A1 * | 6/2013 | Hirose et al. | 296/146.7 |

* cited by examiner

*Primary Examiner* — Pinel Romain
(74) *Attorney, Agent, or Firm* — LeClairRyan

(57) ABSTRACT

A vehicle door provides for the decoupling of the load path by a cut-out area formed in the door inner sheet-metal. In an impact event the front or lower portion of the door inner sheet-metal is pushed inboard while the cut-out area prevents the dragging of the rear or upper portion of the door inner sheet-metal. The cut-out area of the inner door sheet-metal is preferably elongated or can be another shape. It may be a close- or open-ended slot. A stiffening bead may be formed in the inner door sheet-metal adjacent the cut-out area. To provide a seal against water or debris, an adhesive material such as water-proof tape is positioned over the cut-out area. A door beam may be provided. A door spacer block may be positioned between the door beam and the door inner sheet-metal. Door trim padding may be provided over the inner door sheet-metal.

8 Claims, 15 Drawing Sheets

DECOUPLED LOAD-PATH TO REDUCE THE PELVIS COMBINED LOAD OF A VEHICLE OCCUPANT

TECHNICAL FIELD

The disclosed inventive concept relates generally to vehicle systems for protecting occupants in the event of a side impact event. More particularly, the disclosed invention relates to a decoupled load-path to reduce the pelvis combined load of a vehicle occupant. The load path is decoupled through the formation of a slot strategically formed on the door inner sheet-metal. The slot is located on the door inner sheet metal so that the pelvis-plug of occupant lands on the rear/upper portion of the slot.

BACKGROUND OF THE INVENTION

Vehicle doors are typically constructed with two or more panels attached to the door frame, including an exterior or outer sheet-metal panel for shielding the passenger compartment from the elements, and an inner door sheet-metal panel that provides structural support. A trim panel is usually fastened to the inner door panel facing the passenger compartment and shields the vehicle occupants from internal door components, such as the window, the window regulator and the door locks. The trim panel can also provide aesthetic qualities to the interior passenger compartment as well as ergonomic features, for example, easily accessible door handles, mirror and window controls, and the like.

Side impact events in vehicles have been identified as one of the top priorities for both research and regulation with government requirements continuing to become more stringent. It is known that vehicles may collide with obstacles during operation. Frequently the door structure is subjected to a large intrusion.

The test conventionally performed on vehicles to determine crashworthiness in a side impact event, particularly as it relates to the rear passenger dummy is the Lateral Impact New CAR Assessment Program or "LINCAP" test. To undertake this test, a moving deformable barrier (MDB) with a defined mass (commonly 3015 lbs) impacts the target vehicle laterally at a defined speed (commonly 38.5 mph) at a defined crab angle (commonly 27 degrees). This test simulates the accidents occurring on the traffic intersections wherein the impacted vehicle is entering the intersection in response to green signal and impacting vehicle is entering the intersection laterally in effort to over-rule the red signal.

In the LINCAP test, the front driver seat has the 50th percentile ES-2re dummy and the rear passenger seat has the smaller 5th percentile SID-2s test dummy. The 5-star rating in LINCAP test is given to the vehicle based on injury measurements of Front Driver ES2-re test dummy (50% weightage) and injury measurements of Rear Passenger SID-2s test dummy (50% weightage). The rear passenger 5-star rating is dependent on the head injury (HIC36) and the pelvis injury ("pelvis combined load"). Pelvis combined load of the rear passenger plays a significant role in overall 5-star rating for the vehicle in LINCAP test.

A pelvis combined load of a rear dummy is a result of the bumper of the MDB impacting door-outer sheet-metal, which stacks-up against the door inner sheet-metal and the door-trim. Without any counter-measures, the pelvis combined load of the test dummy can go as high as 4000 to 6000N. A pelvis combined load of 3200N leads to high confidence 5-star rating for the rear test dummy in LINCAP test.

In the LINCAP test, the bumper of the moving deformable barrier is commonly a 750 psi honeycomb block. When the bumper impacts the rear door outer sheet-metal, the gap between the door outer and door inner gets partially closed. The presence of the door beams, flutter brace, window motor, and other components typically fitted inside the door structure prevents the gap from closing completely. The door inner sheet-metal which moves inboard after the barrier impact, crushes the map-pocket wall. The gap between the door inner sheet metal and the door-trim substrate closes as the map-pocket wall crushes. The stacked up MDB bumper, door structure and door-trim then loads the pelvis and the femur region of the rear passenger test dummy. The pelvic load goes up to 4000 to 6000N depending on the intrusion levels and residual energy of the moving deformable barrier.

In an effort to improve the protection of vehicle occupants during a side impact event automotive vehicles have been provided with various structural upgrades and restraint systems to lessen the effects of a collision type impact on an occupant compartment of the vehicle. Particularly, to lessen the effects of a side collision type impact of the vehicle occupant seating area, a number of approaches have been undertaken. These include stiffening the rocker and C-pillar to absorb the impact energy of the moving deformable barrier, providing door beams inside the door structure to slow down the moving deformable barrier, providing soft foam in the pelvis location of the rear door-trim that acts as a cushion protecting the pelvis of the occupant, providing stiffening foam in the femur location of the door-trim which pushes the femur of the occupant away leading to increased gap between the dummy pelvis and the door-trim substrate, and providing a pelvis airbag inside the rear seat of the vehicle that protects the pelvis region of the rear occupant.

Accordingly, as in so many areas of vehicle technology, there is room in the art of vehicle door design for an alternative configuration to known door structures which provides effective protection in a side impact event while maintaining relatively low manufacturing and assembly costs.

SUMMARY OF THE INVENTION

The disclosed inventive concept represents advancement in the art of occupant protection in a side impact event. Particularly, the disclosed inventive concept decouples the load path to the pelvis of an occupant in an effort to reduce the pelvis combined load of the rear test dummy so as to meet the 5-star rating for the rear dummy in LINCAP test.

The disclosed inventive concept provides for the decoupling of the load path to the pelvis portion of the test dummy by creating a cut-out area in the strategic location on the door inner sheet-metal. The cut-out area is located on the door inner sheet-metal so that the pelvis-plug of the test dummy lands on the rear or upper portion of the cut-out area. The front or lower portion of the door inner sheet-metal is pushed inboard by the loading of the MDB bumper on the door-outer and window motor. The cut-out area prevents the dragging of the rear or upper portion of the door inner sheet-metal by the "bumper-door-outer-window-motor" combination.

The result of this solution is that femur of the test dummy continues to get loaded by the stacked up "bumper-door-outer-motor-door-inner-foam-substrate" combination. However, the pelvic plug lands on the substrate and the door inner sheet-metal that is not stacked against the door outer. This leads to reduction in the pelvis combined load below 3200N and, in turn, helps meet the 5-star rating for rear dummy with high confidence.

The cut-out area of the inner door sheet-metal is preferably elongated although the cut-out area could be of any shape suitable for the decoupling purpose. The cut-out area may be a close-ended slot or may be open-ended. A stiffening bead may be formed in the inner door sheet-metal adjacent the cut-out area. In addition, to provide a seal against water or debris an adhesive material such as water-proof tape is positioned over the cut-out area.

As a further variation of the disclosed inventive concept a door beam may also be provided. A door spacer block preferably composed of a polymerized material may be positioned substantially between the door inner sheet-metal/door beam and the door-trim substrate.

A door trim padding may be provided over the inner door sheet-metal. The door trim padding reduces NVH and covers any sharp edges that might be on the inner door sheet-metal.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
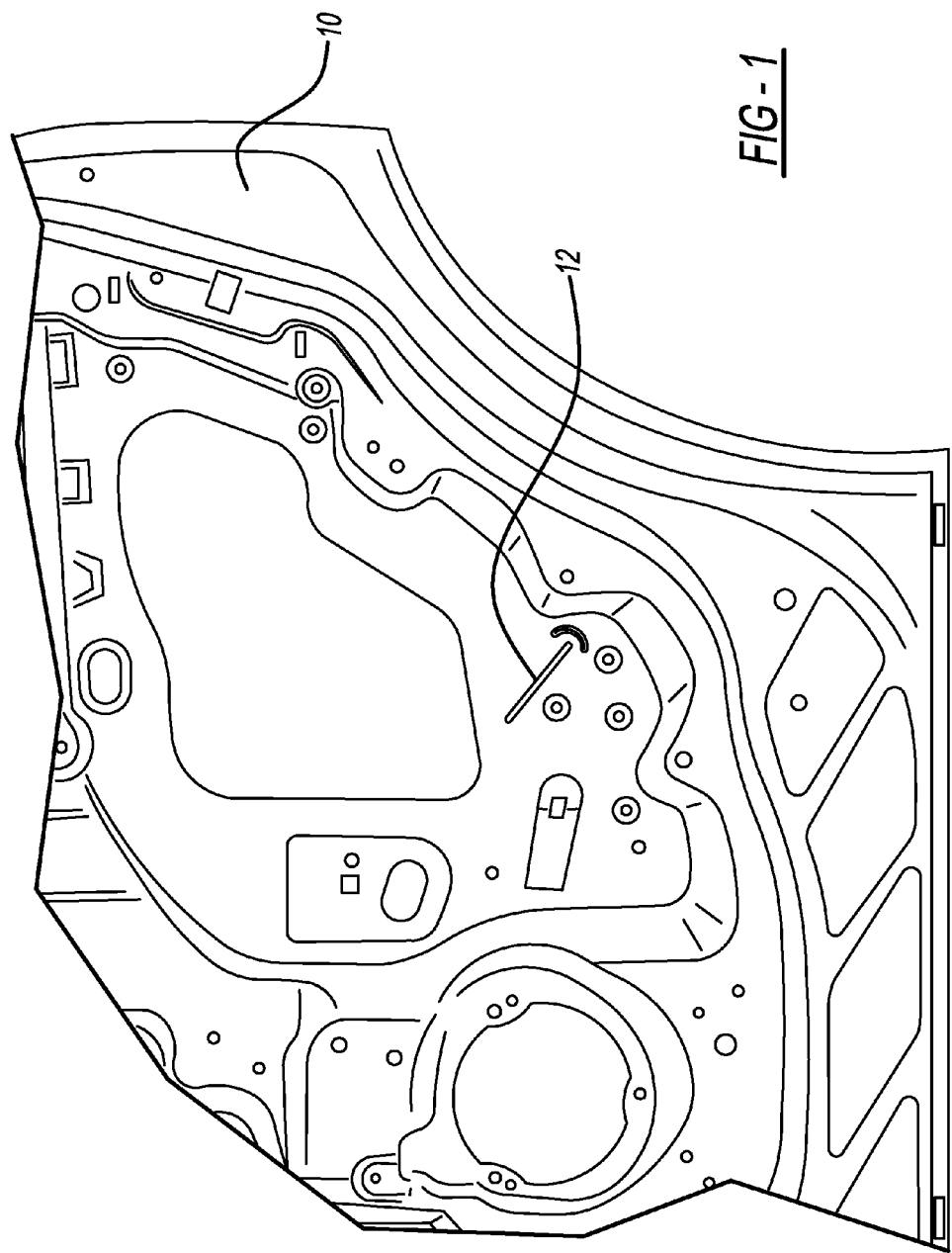
FIG. 1 illustrates a side view of a portion of a door inner sheet-metal illustrated the strategically placed load decoupling slot according to the disclosed inventive concept.

In the following figures, the same reference numerals will be used to refer to the same components. In the following description, various operating parameters and components are described for different constructed embodiments. These specific parameters and components are included as examples and are not meant to be limiting.

Referring to FIG. 1, a side view of a portion of a door inner sheet-metal according to the disclosed inventive concept, generally illustrated as 10, is shown. The door inner sheet-metal 10 may be either a front door of a vehicle or a rear door of a vehicle. The overall shape of the door inner sheet-metal 10 as shown is intended as being illustrative rather than limiting as other configurations of the door inner sheet-metal 10 may be adopted.

The door inner sheet-metal 10 includes a strategically placed load decoupling cut-out area 12 as illustrated. The load decoupling cut-out area 12 may be an elongated slot as illustrated or may be another shape as may be preferred. The load decoupling cut-out area 12 may be close-ended as illustrated or may be open-ended (not shown) as may be preferred. Accordingly, it is to be understood that the load decoupling cut-out area 12 as shown as a close-ended, elongated slot is suggestive and is not intended as being limiting.

Figure 2:
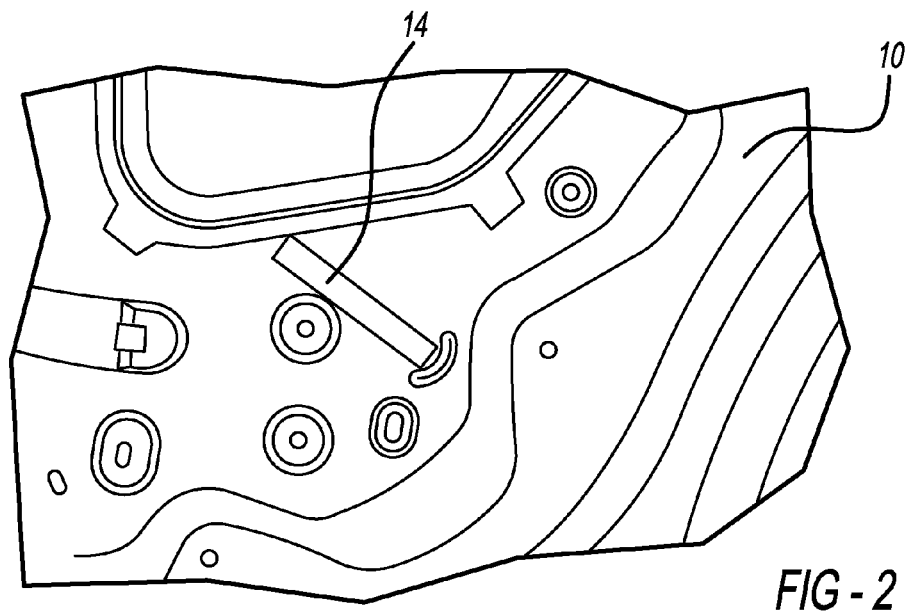
FIG. 2 illustrates a close-up view of the slot formed in the inner sheet-metal shown in FIG. 1 illustrated with tape positioned over the slot.

In order to prevent water leakage or the passage of debris into the door inner sheet-metal 10 via the decoupling cut-out area 12, a seal, preferably in the form of one-sided adhesive tape 14, is fitted over the decoupling cut-out area 12 as shown in FIG. 2. Other sealing arrangements may be used for this purpose.

Figure 3:
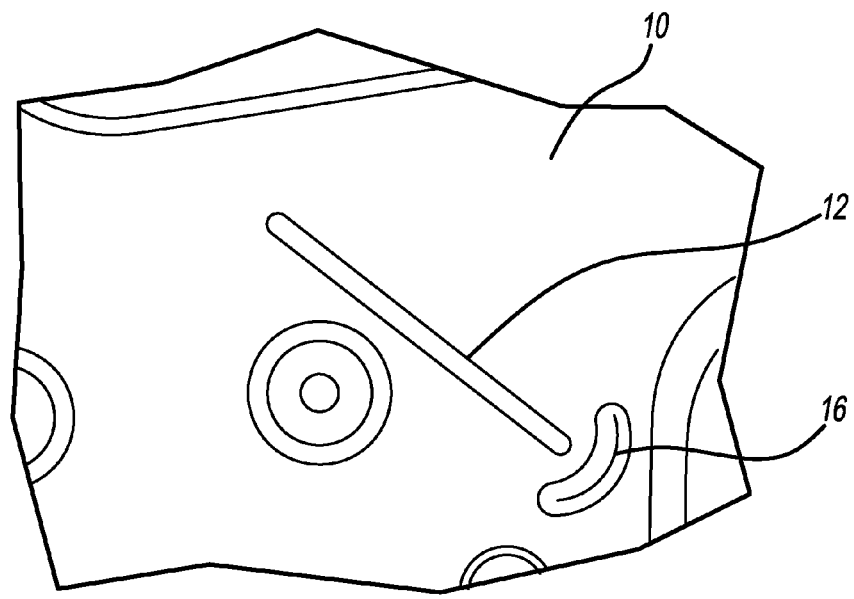
FIG. 3 illustrates an additional close-up view of the slot formed in the inner sheet-metal shown in FIG. 1 in which a stiffening bead is illustrated in detail.

The door inner sheet-metal 10 may be further modified for structural advantage. For example, a stiffening bead 16 may be formed at an area adjacent to the decoupling cut-out area 12 as illustrated in FIG. 3. The stiffening bead 16 is effective in helping to prevent premature cracking of the door inner sheet-metal 10. The shape of the stiffening bead 16 shown in FIG. 3 is suggested and is not intended as being limiting.

Figure 4:
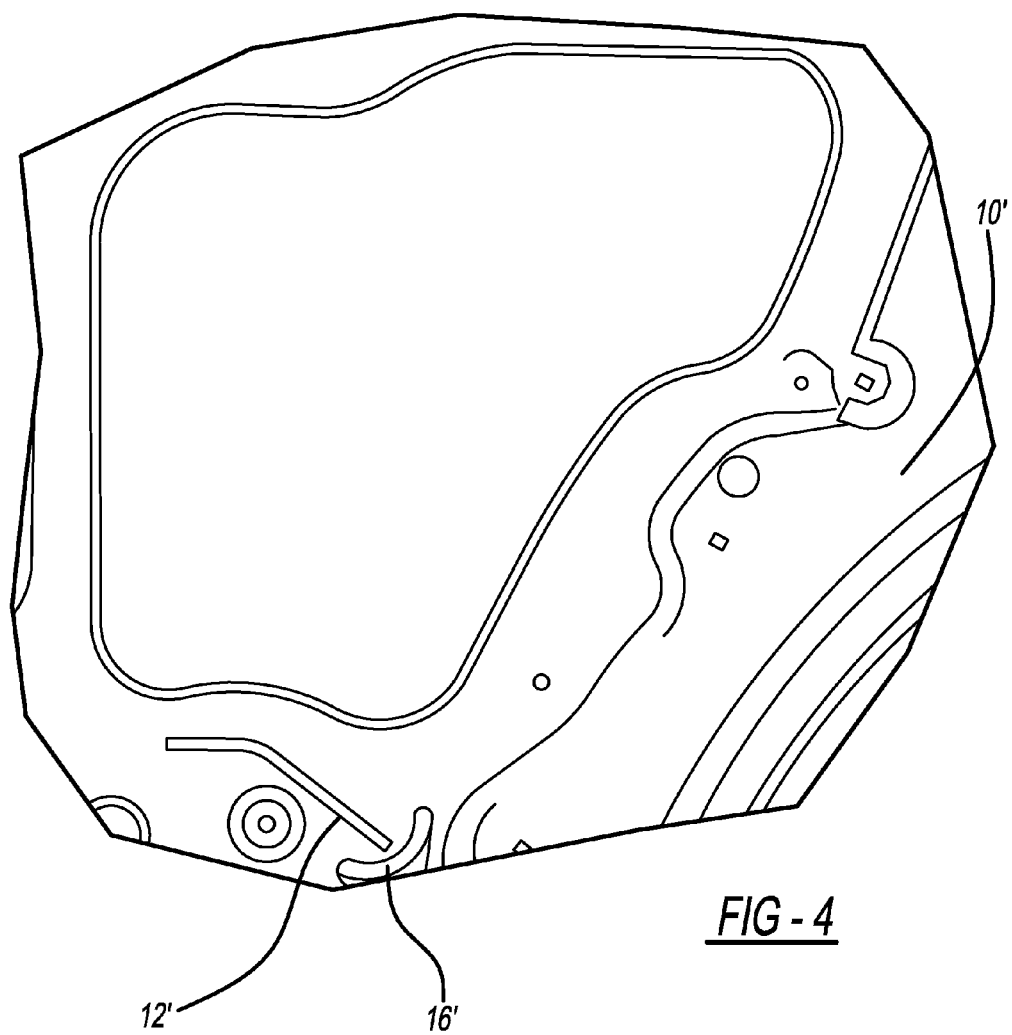
FIG. 4 illustrates an alternate embodiment of the slot formed in the inner sheet-metal of the disclosed inventive embodiment.

The shape of the decoupling cut-out area 12 shown in FIGS. 1 and 3 is only suggestive and is not intended as being limiting. Alternate shapes of the decoupling cut-out area are possible. For example, and referring to FIG. 4, a door inner sheet-metal 10' has formed thereon a decoupling cut-out area 12' and an adjacent stiffening bead 16'. As illustrated, the decoupling cut-out area 12' has an inverted, open L-shape.

Figure 5:
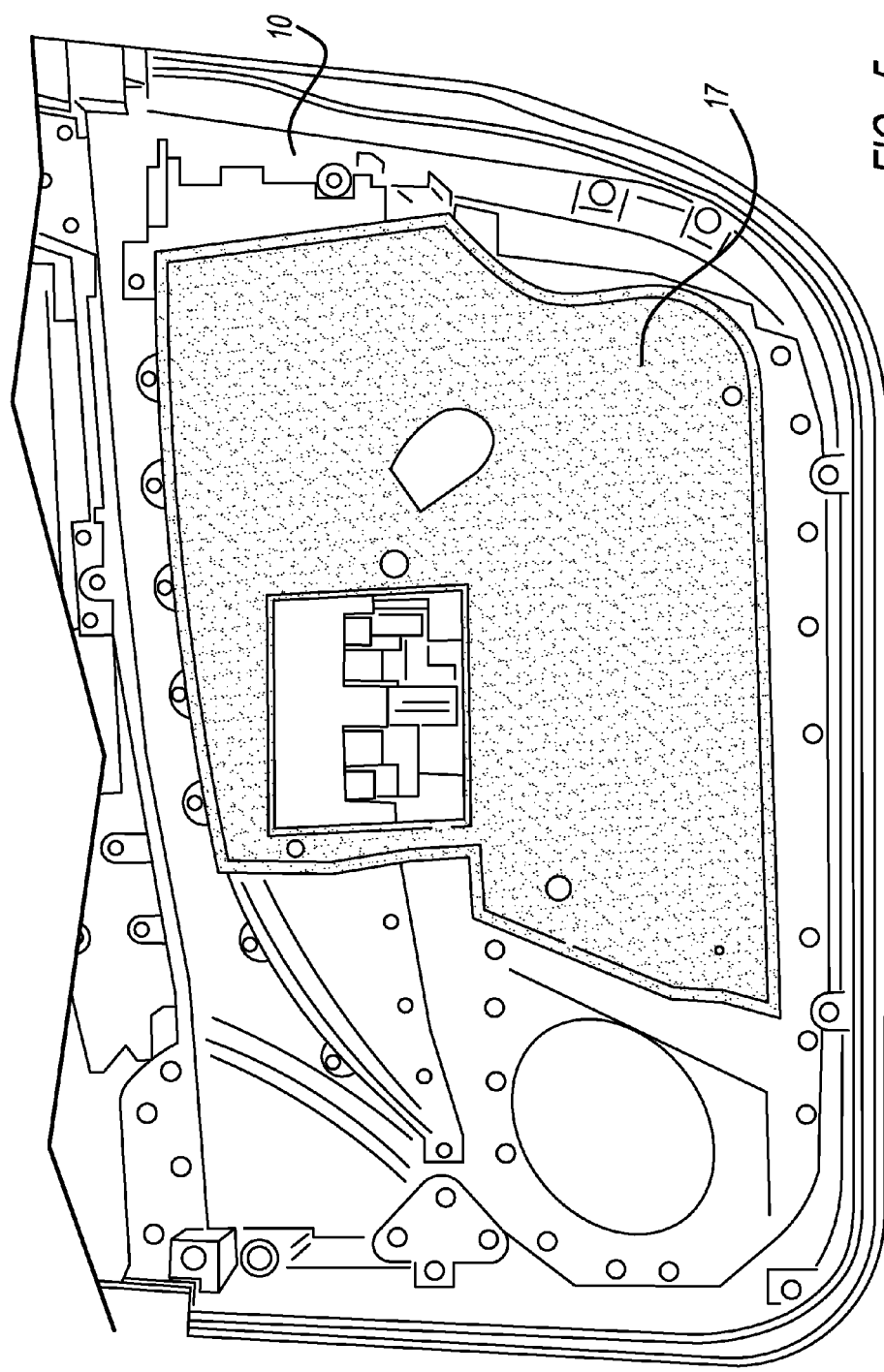
FIG. 5 illustrates a view similar to that of FIG. 1 but showing a complete side view of the door inner sheet-metal having fitted thereover door-trim fabric padding.

In response to concerns over the door inner sheet-metal 10 rubbing against adjacent door components, a fabric padding 17 may be provided over at least a portion of the door inner sheet-metal 10 as shown in FIG. 5. This arrangement prevents possible damage to adjacent components of the door due to sharp edges that may be present on the door inner sheet-metal 10. The provision of the fabric padding 16 also assists in the reduction of NVH.

Figure 6:
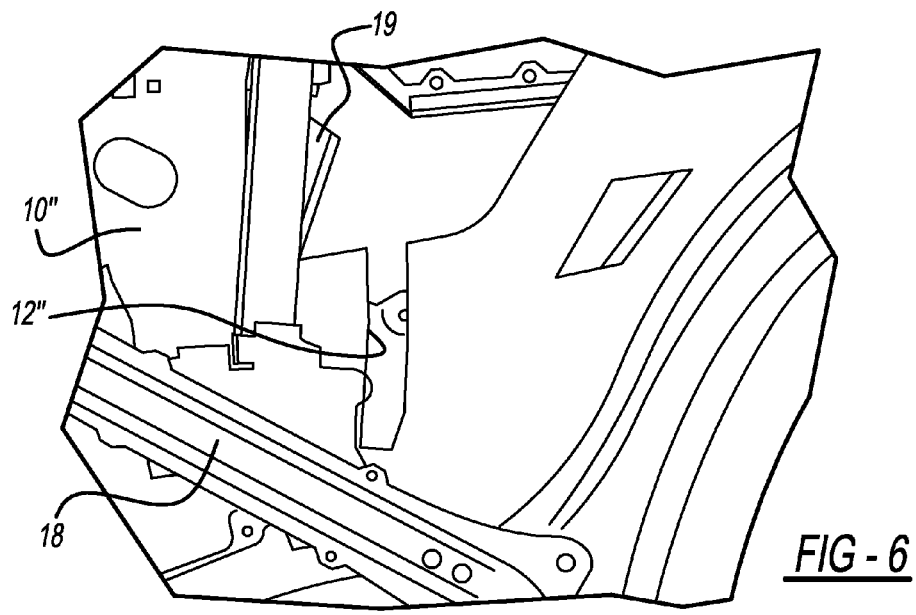
FIG. 6 illustrates a view similar to that of FIG. 1 but showing door femur foam and a door guard beam in place.
Figure 7:
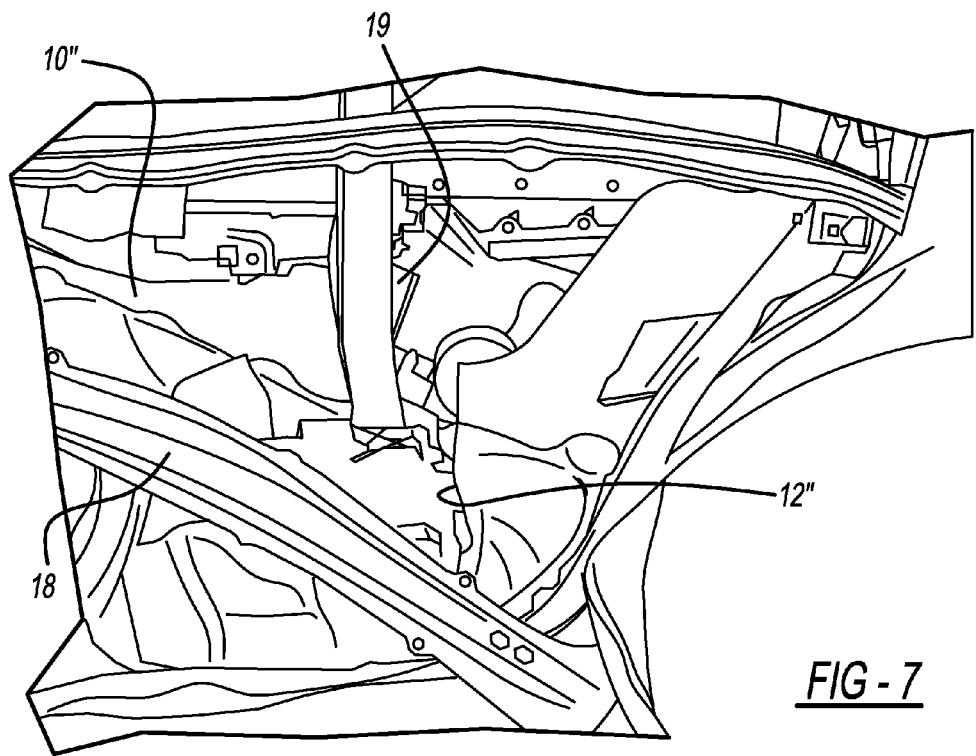
FIG. 7 is a view similar to that of FIG. 6 but showing the door inner sheet-metal panel with the decoupled load path 45 milliseconds after a side impact event.

A number of modifications may be made to the disclosed inventive concept to further enhance benefit in the industry. Two such modifications are shown in FIGS. 6 and 7. With reference thereto, a door guard beam 18 is fitted to the door inner sheet-metal 10. The shape and function of the door guard beam 18 is known in the art and typically extends from one side of the door to the other.

In addition, a door spacer block (or femur foam block) 19, preferably composed of a foamed polymerized material, may be incorporated into the disclosed device. The door spacer block 19 is strategically located at least partially between the door guard beam 18 and the door inner sheet-metal 10. The door spacer block 19 is provided at least in part to at least partially address NVH concerns. The shape of the door spacer block 19 as shown in FIGS. 6 and 7 is suggestive and is not intended as being limiting.

FIG. 6 illustrates a door inner sheet-metal 10" of the disclosed inventive concept prior to an impact event. As shown, a load decoupling cut-out area 12" is strategically formed in the door inner sheet-metal 10". The decoupling cut-out area 12" is open-ended as may be preferred according to a given door inner sheet-metal configuration.

After an impact event, and as illustrated in FIG. 7, the load decoupling cut-out area 12" has partially collapsed and the two adjacent portions are at least partially overlapped. This result successfully reduces the pelvis combined load on an adjacent occupant.

FIGS. 8 through 10 and FIGS. 13 through 15 illustrate the differences of the load path through vehicle door configurations of the prior art as well as according to the disclosed inventive concept. Of these figures, the prior art may be seen in FIGS. 8 and 9 and in FIGS. 13 and 14.

Figure 8:
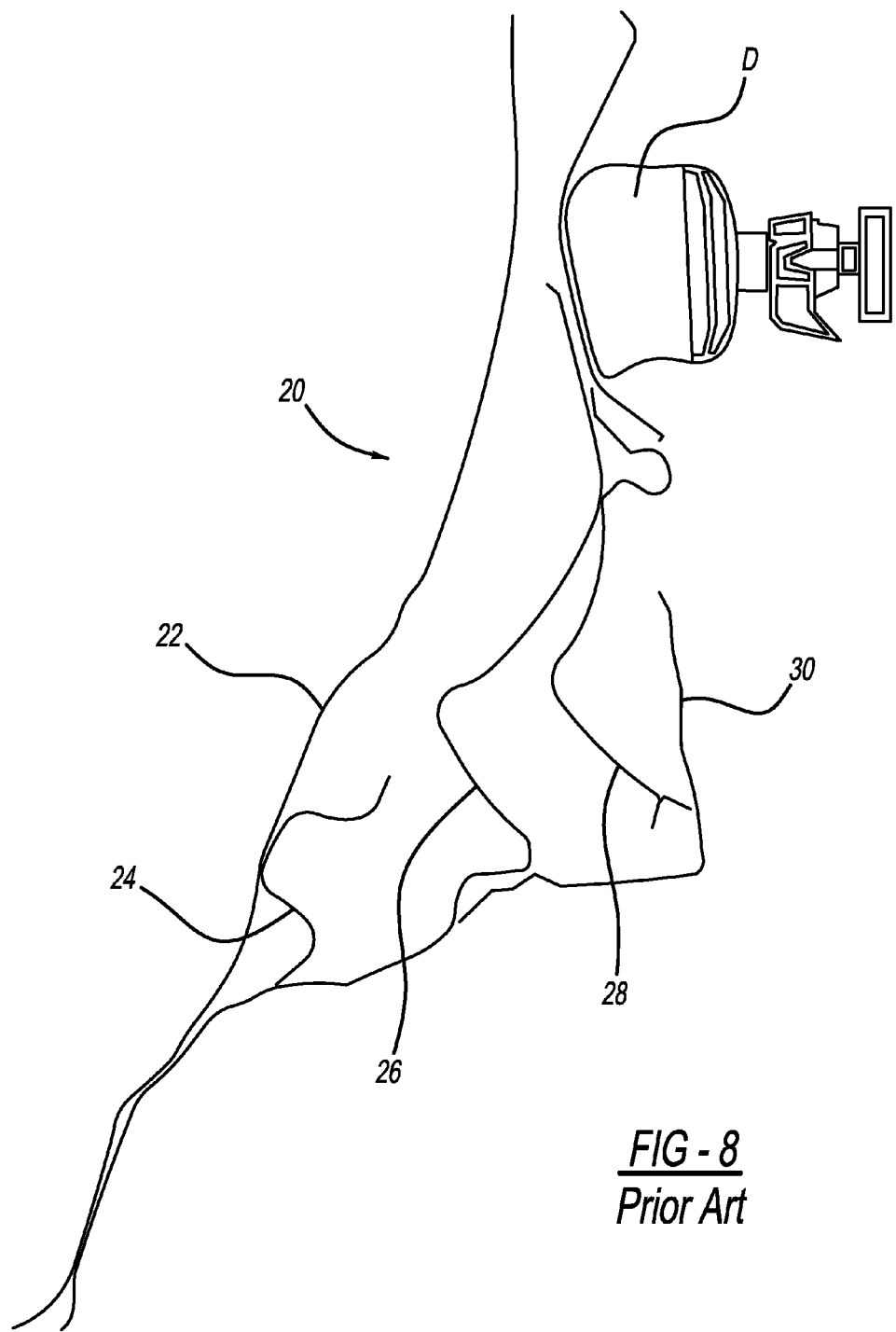
FIG. 8 shows a stylized sectional view of a conventional vehicle door according to the prior art following an impact event.

Referring to FIG. 8, a stylized sectional view of a conventional vehicle door, illustrated as 20, is shown following an impact event. The door 20 is shown adjacent a test dummy D. The door 20 includes a door outer sheet-metal 22, a door guard beam 24, a door inner sheet-metal 26, a door-trim map pocket 28, and a door trim substrate 30. As shown, the test dummy D pelvic acetabulum plug has undergone compression following the impact event.

Figure 9:
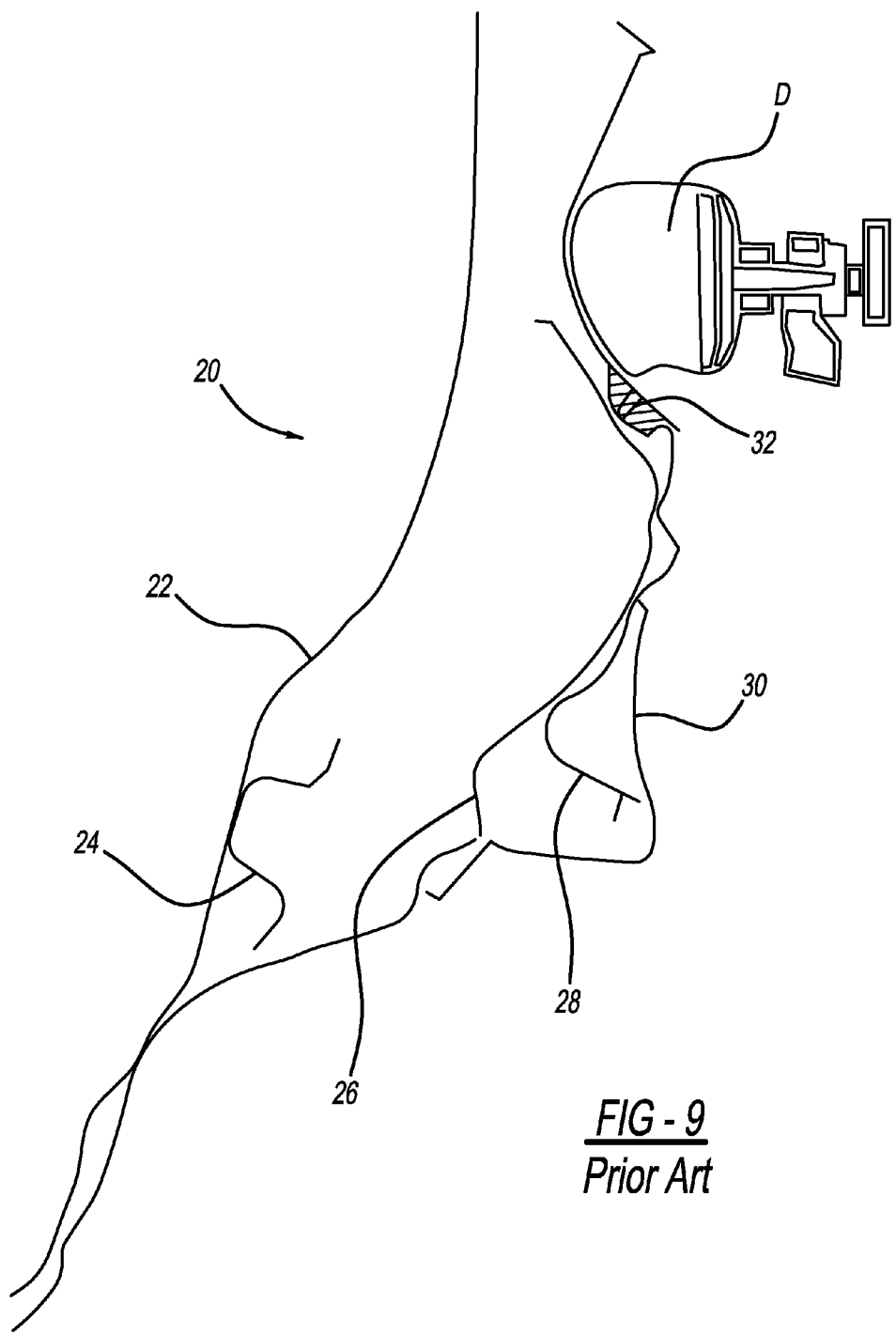
FIG. 9 shows a stylized sectional view of a conventional vehicle door according to the prior art that includes a door foam insert following an impact event.

FIG. 9 is a view similar to that of FIG. 8 but illustrates the prior art arrangement as including a door foam insert 32. Following an impact event as illustrated, the test dummy D pelvic acetabulum plug has again undergone compression, though the degree of compression is less than that shown in FIG. 8 without the door foam insert 32.

Figure 10:
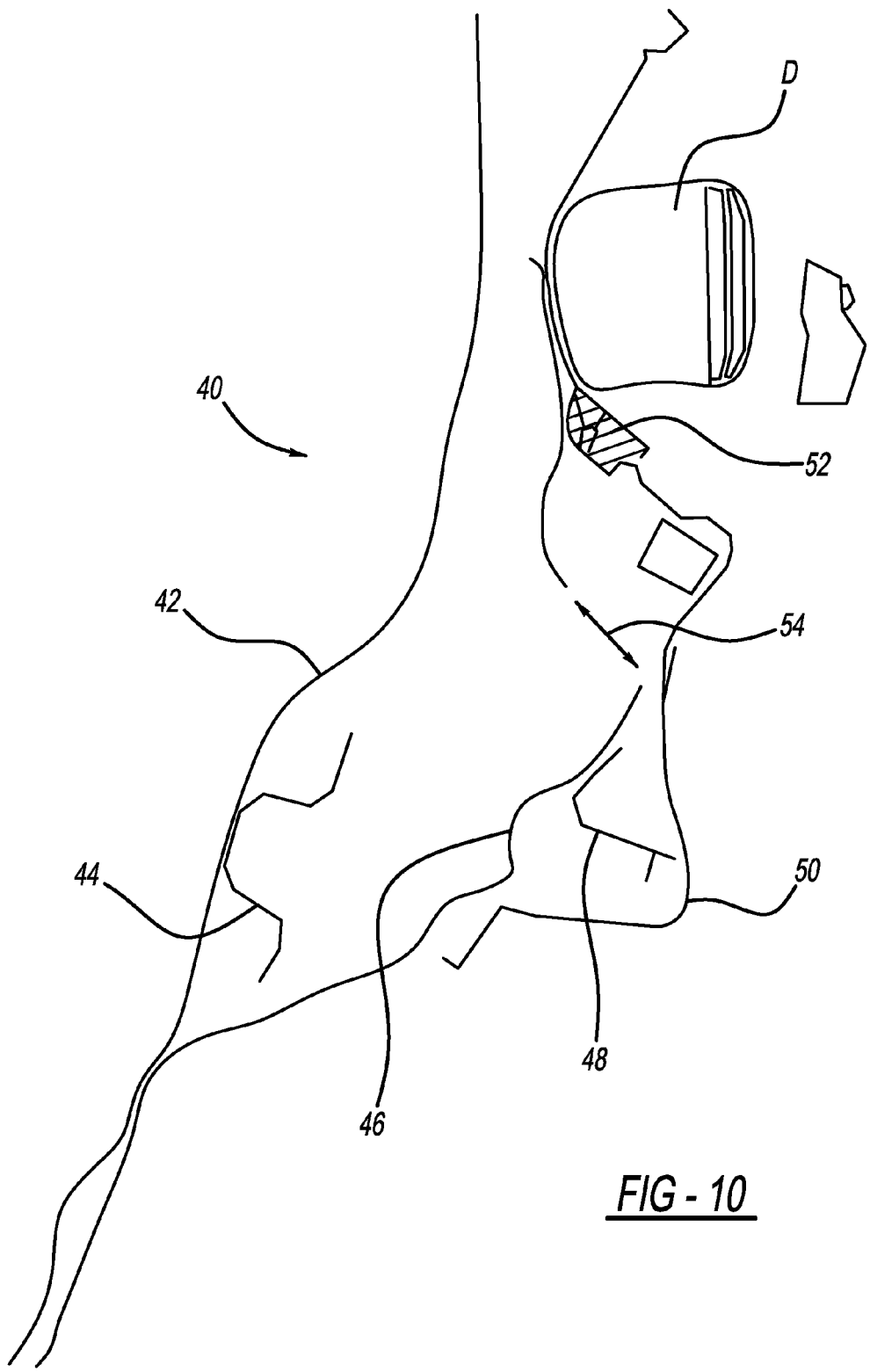
FIG. 10 shows a stylized sectional view of a vehicle door according to the disclosed inventive concept that includes a door foam insert following an impact event.

FIG. 10 is a stylized sectional view of a vehicle door, generally illustrated as 40, according to the disclosed inventive concept. The vehicle door 40 includes a door outer sheet-metal 42, a door guard beam 44, a door inner sheet-metal 46, a door-trim map pocket 48, a door trim substrate 50, and a door foam insert 52. Formed in the door inner sheet-metal 46 is a decoupling cut-out area 54 that is based on the decoupling cut-out area 12' of FIGS. 6 and 7. As illustrated in FIG. 10, the decoupling cut-out area 54 has decoupled the load path after the impact event, thus resulting in no compression of the pelvic acetabulum plug of the test dummy D following the impact event.

Figure 11:
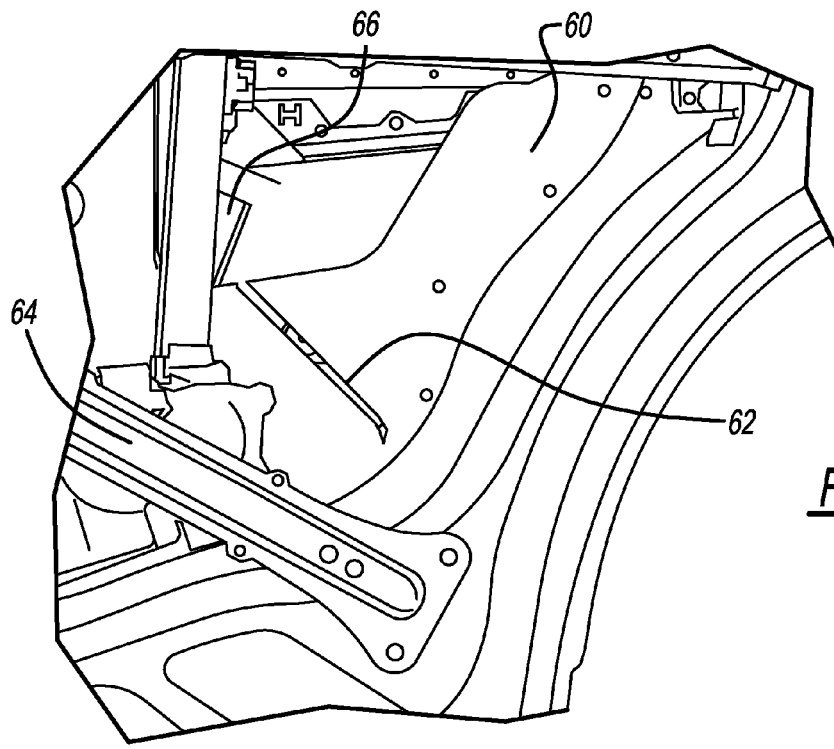
FIG. 11 shows a portion of a vehicle door having a slot formed in the door inner sheet-metal according to the disclosed inventive concept prior to an impact event.
Figure 12:
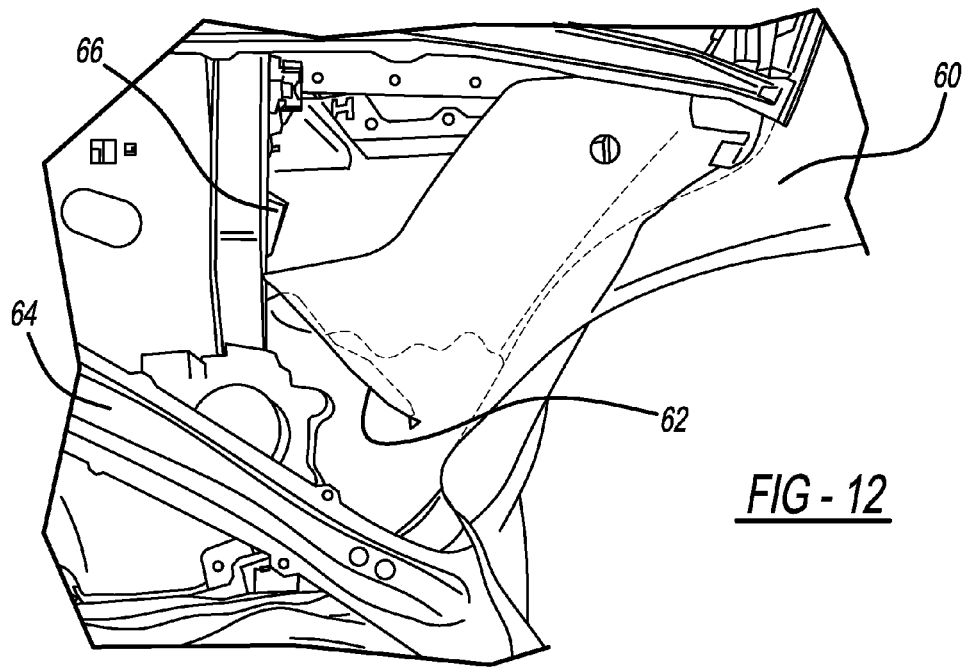
FIG. 12 shows is the same view as FIG. 11 but illustrates the door after an impact event.

As noted above, the shape of the decoupling cut-out area of the disclosed inventive concept may be varied as required for different applications. FIGS. 11 and 12 illustrate such a variation. As set forth in FIG. 11, a door inner sheet-metal 60 according to the disclosed inventive concept is shown prior to an impact event. A relatively narrow and elongated load decoupling cut-out area 62 is strategically formed in the door inner sheet-metal 60. As illustrated, the decoupling cut-out area 60 is open-ended as may be preferred according to a given door inner sheet-metal configuration. A door guard beam 64 is provided in conjunction with the door inner sheet-metal 60 as is a door trim foam 66.

After an impact event, and as illustrated in FIG. 12, the load decoupling cut-out area 62 has partially collapsed and the two adjacent portions are at least partially overlapped. As with arrangements of the disclosed inventive concept discussed above, this result successfully reduces the pelvis combined load on an adjacent occupant.

Figure 13:
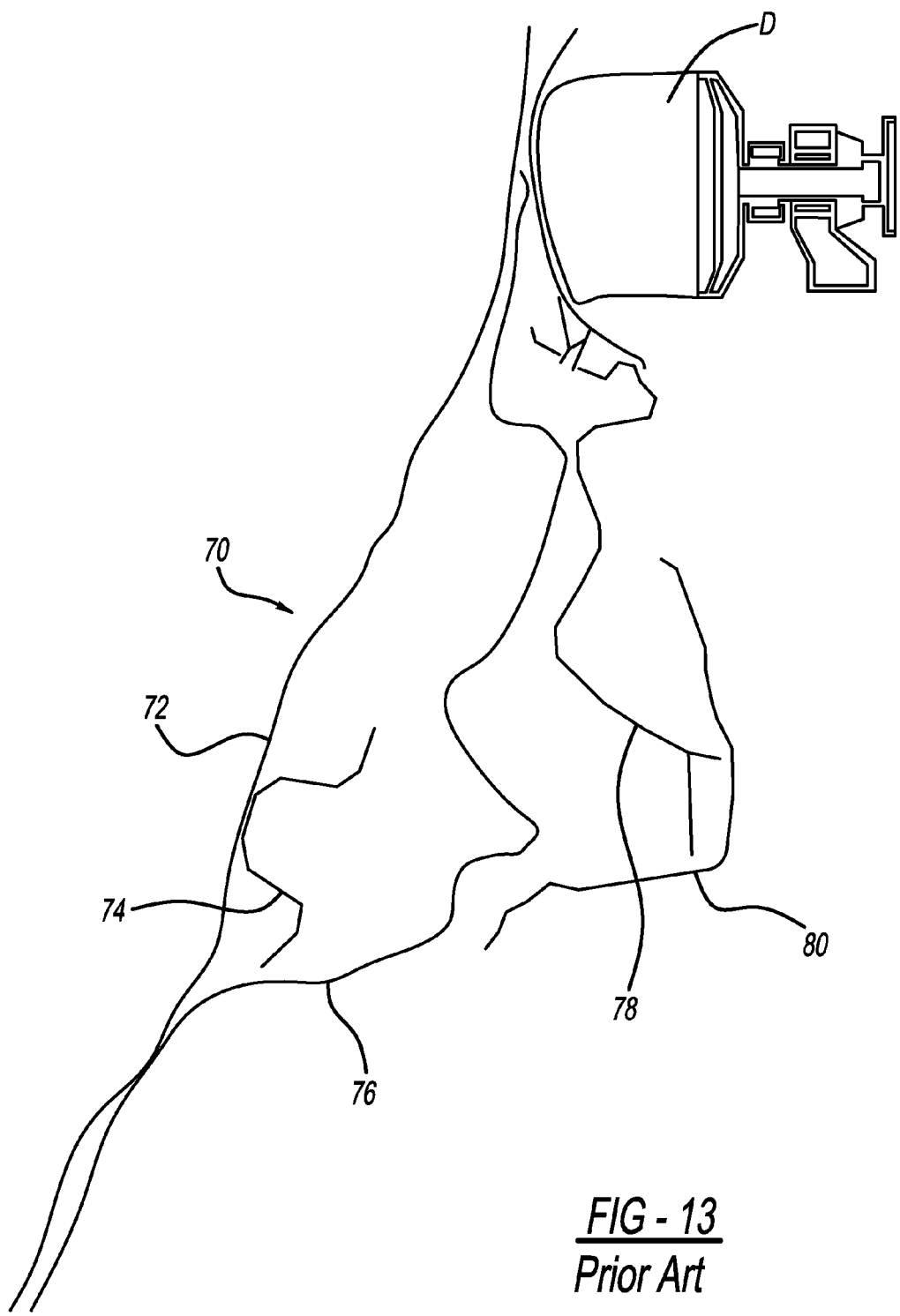
FIG. 13 shows a stylized sectional view of an additional conventional vehicle door according to the prior art following an impact event.

As noted above, FIGS. 13 through 15 illustrate an alternative load path of the disclosed inventive concept relative to known technology. Particularly, FIG. 13 illustrates a stylized sectional view of a conventional vehicle door, illustrated as 70, is shown following an impact event. The door 70 is shown adjacent a test dummy D. The door 70 includes a door outer sheet-metal 72, a door guard beam 74, a door inner sheet-metal 76, a door-trim map pocket 78, and a door trim substrate 80. As shown, the test dummy D pelvic acetabulum plug has undergone compression following the impact event.

Figure 14:
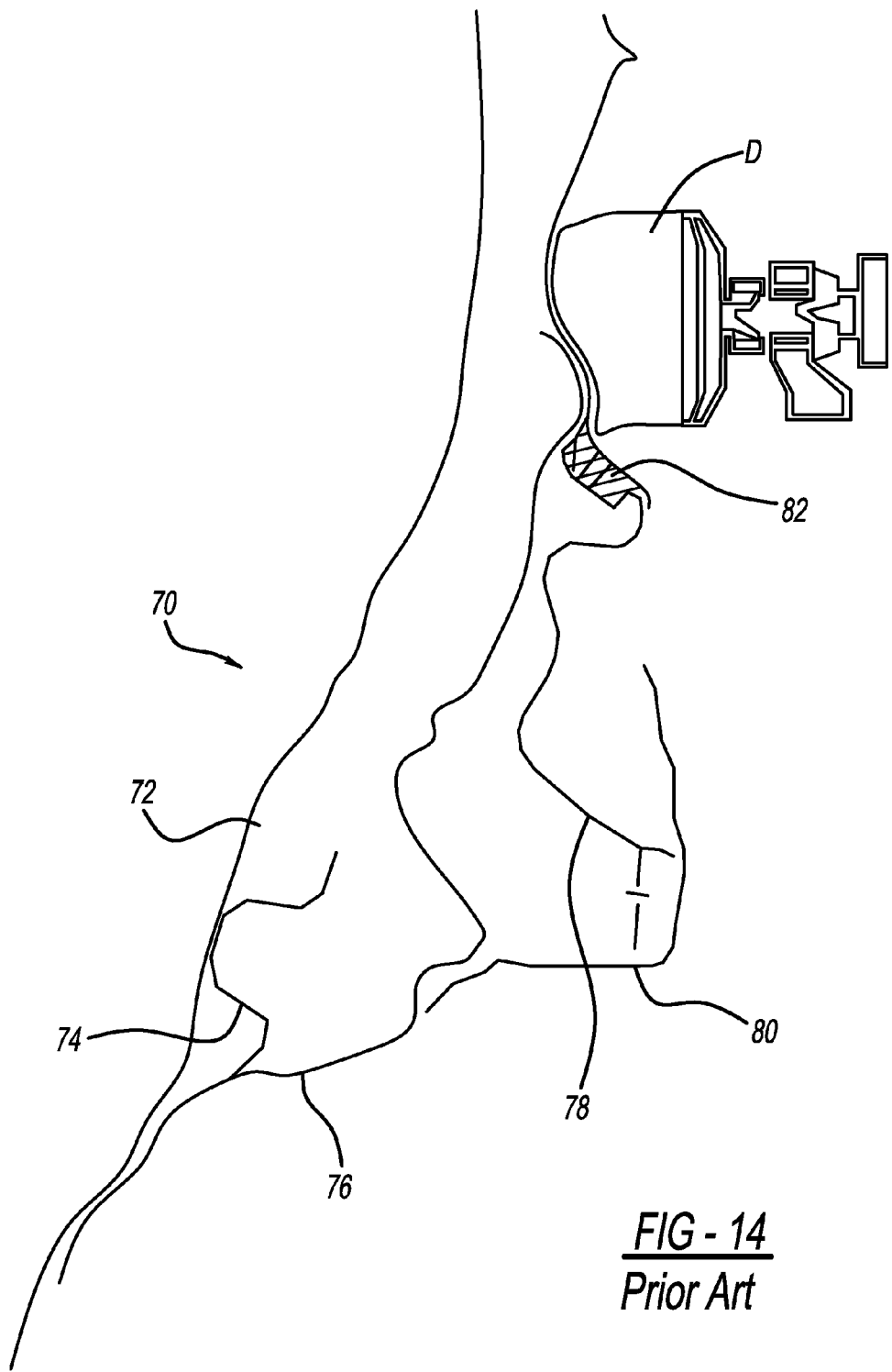
FIG. 14 shows a stylized sectional view of an additional conventional vehicle door according to the prior art that includes a door foam insert following an impact event.

FIG. 14 is a view similar to that of FIG. 13 but illustrates the prior art arrangement as including a door foam insert 82. Following an impact event as illustrated, the test dummy D has again undergone compression, though the degree of compression is less than that shown in FIG. 13 without the door foam insert 82.

Figure 15:
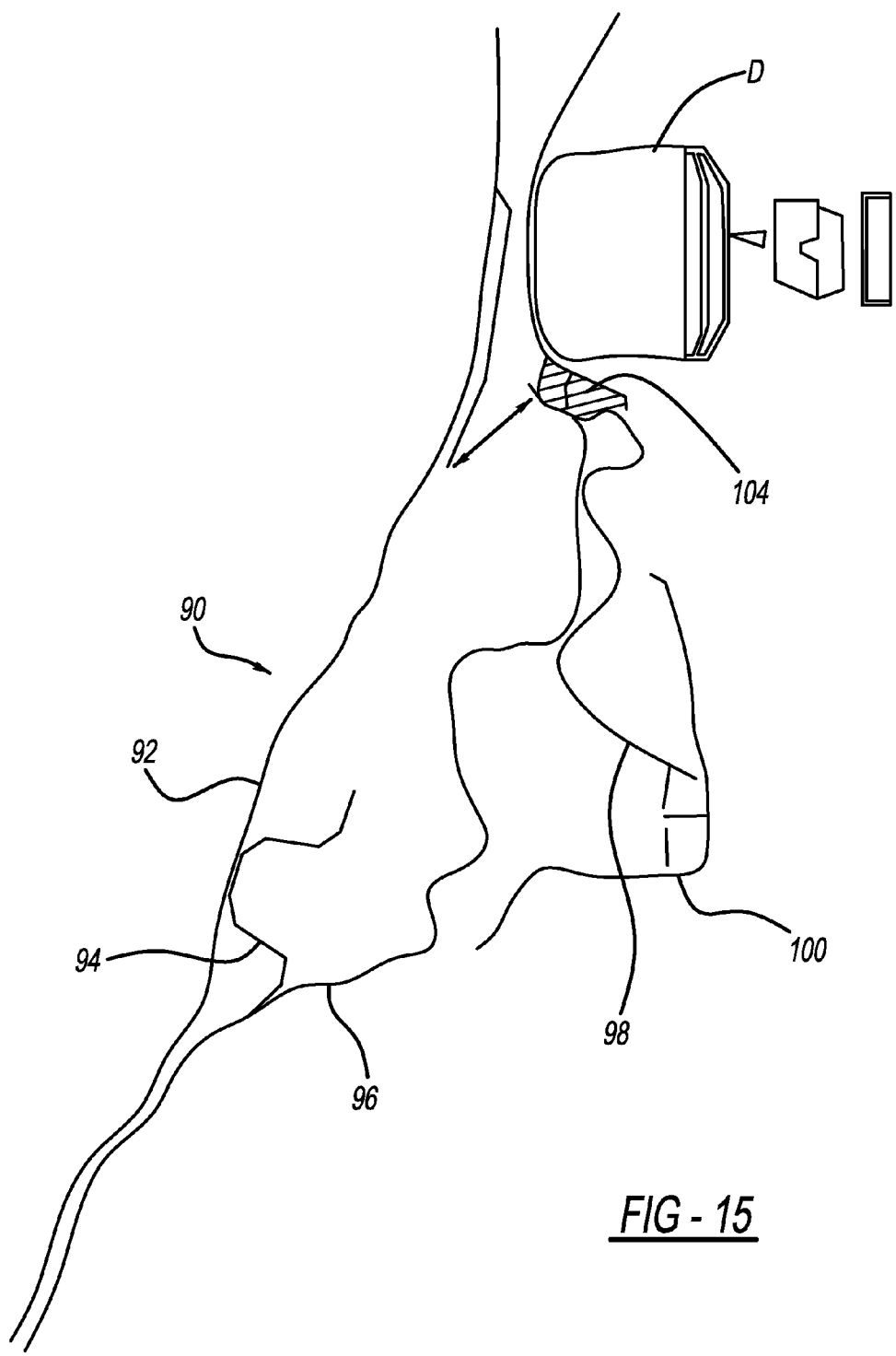
FIG. 15 shows a stylized sectional view of an additional vehicle door according to the disclosed inventive concept that includes a door foam insert following an impact event.

FIG. 15 is a stylized sectional view of a vehicle door, generally illustrated as 90, according to the disclosed inventive concept. The vehicle door 90 includes a door outer sheet-metal 92, a door guard beam 94, a door inner sheet-metal 96, a door-trim map pocket 98, a door trim substrate 100, and a door foam insert 102. Formed in the door inner sheet-metal 96 is a decoupling cut-out area 104 that is based on the decoupling cut-out area 62 of FIGS. 11 and 12. As illustrated in FIG. 15, the decoupling cut-out area 104 has decoupled the load path after the impact event, thus resulting in no compression of the test dummy pelvic acetabulum plug PP following the impact event.

Figure 16:
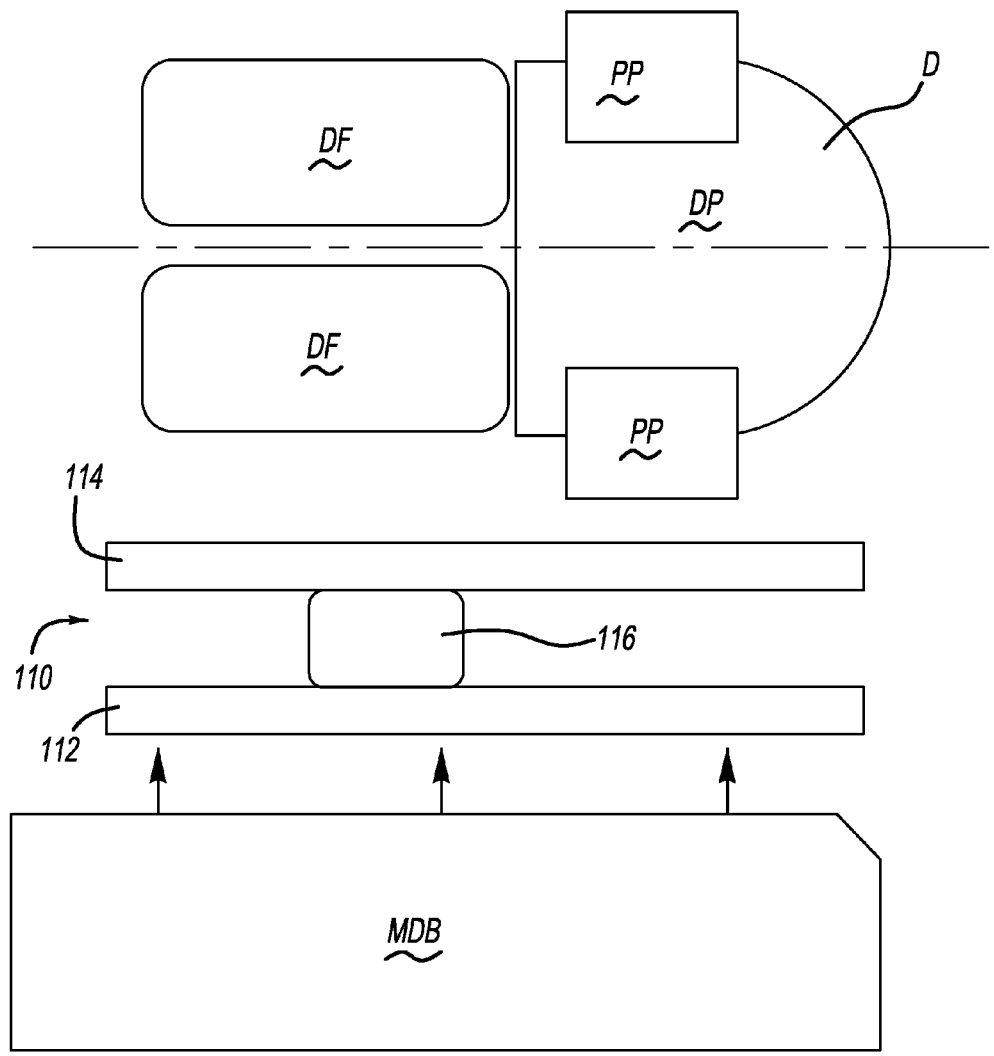
FIG. 16 is a schematic illustration of a conventional vehicle door shown in relation to a test dummy prior to an impact event.
Figure 17:
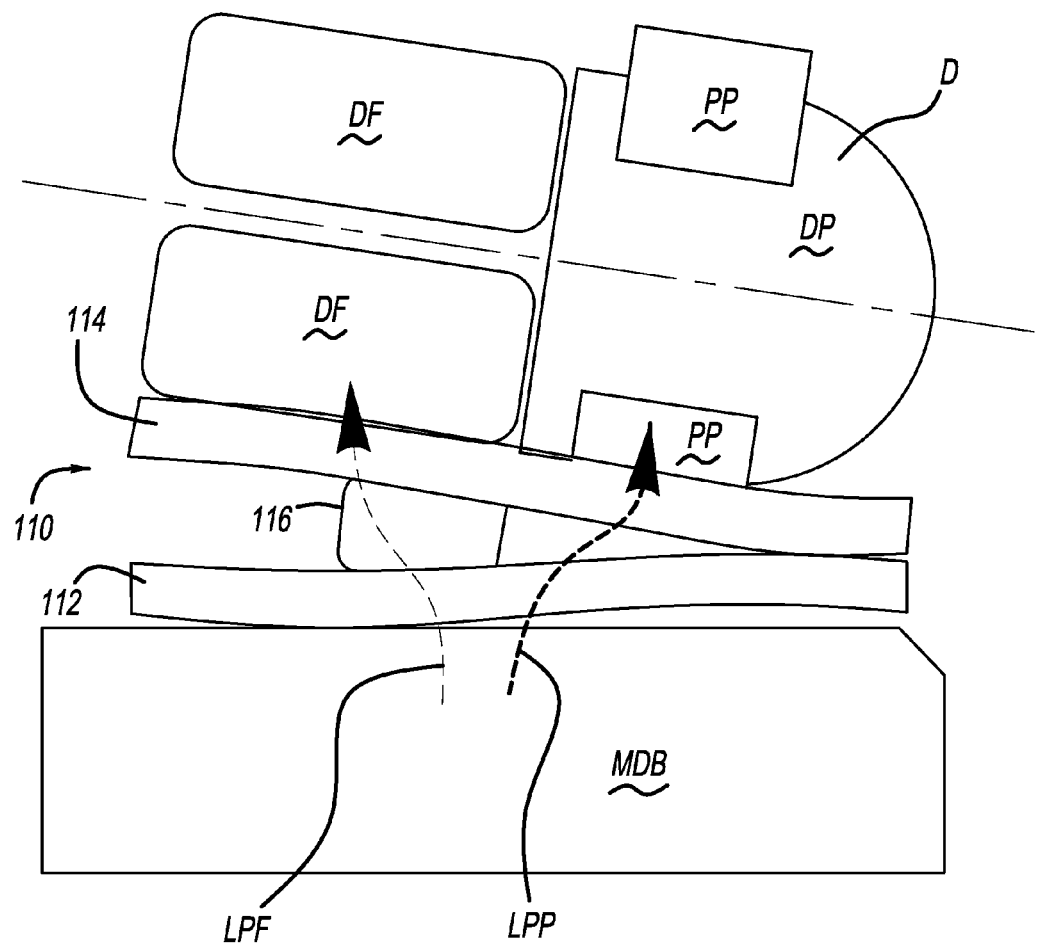
FIG. 17 is a schematic illustration of the conventional vehicle door of FIG. 16 shown in relation to a test dummy following an impact event.
Figure 18:
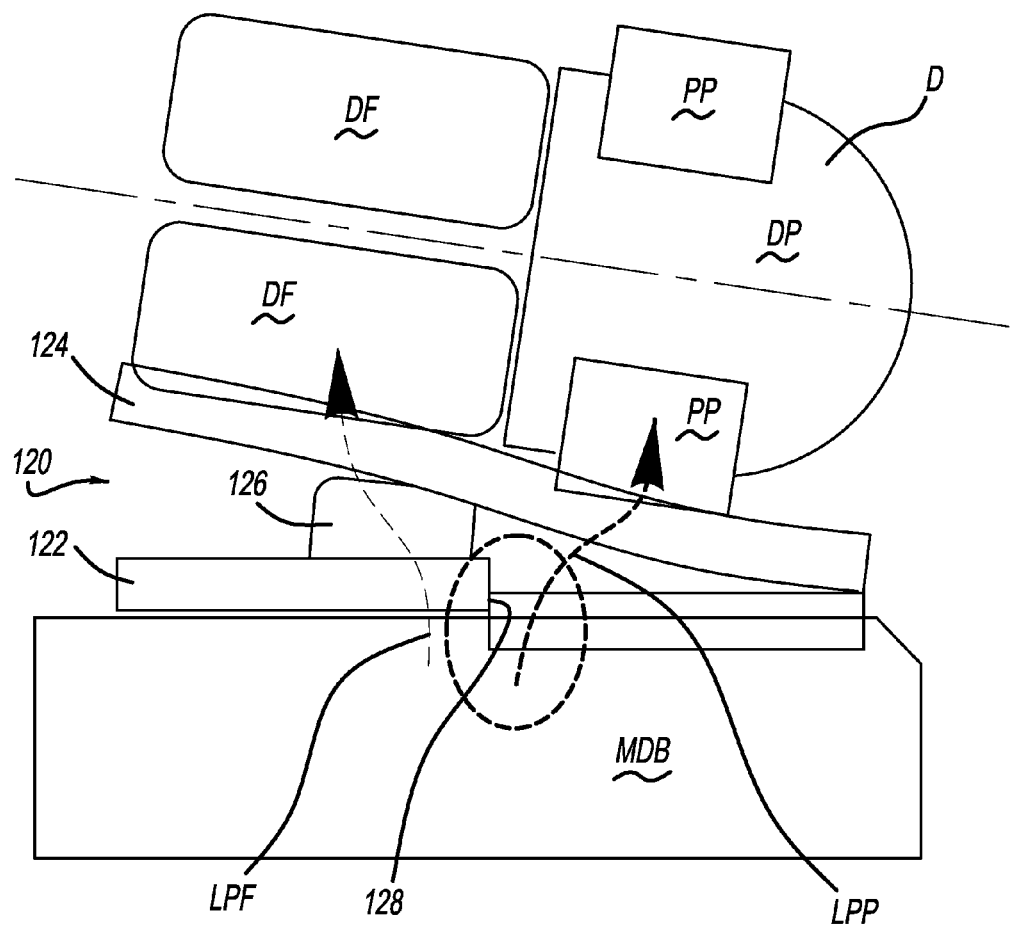
FIG. 18 is a schematic illustration of a vehicle door according to the disclosed inventive concept shown in relation to a test dummy prior following an impact event.

FIGS. 16 through 18 are schematic representations that illustrate how the decoupled load path of the disclosed inventive concept limits impact of the door trim on an occupant in comparison with known approaches to occupant protection.

Referring to FIG. 16, a schematic illustration of a conventional vehicle door 110 shown in relation to a test dummy D prior to an impact event is shown. The test dummy D includes dummy femurs DF, a dummy pelvis DP, and movable dummy pelvic acetabulum plugs PP. The vehicle door 110 includes a door inner sheet-metal 112, a door trim 114 and a door foam 116. A moving deformable barrier MDB is shown adjacent to the vehicle door 110 prior to impact.

In FIG. 17, the conventional vehicle door 110 has been impacted by the moving deformable barrier MDB. As illustrated, the door inner sheet-metal 112 has been pressed against the door foam 116 which, in turn, has been pressed against the door trim 114. The load path to the femur LPF and the load path to the pelvis LPP caused this chain of events. As a result, and as shown in this figure, the door trim 114 has in turn impacted against the adjacent movable pelvic acetabulum plug PP of the test dummy D.

FIG. 18 is a schematic illustration of a vehicle door 120 according to the disclosed inventive concept shown in relation to the test dummy D prior following an impact event. The vehicle door 120 of the disclosed inventive concept includes a door inner sheet-metal 122, a door trim 124, and a door foam 126. A decoupling cut-out area 128 is formed on the door inner sheet-metal 122.

Following impact by the moving deformable barrier MDB, the door inner sheet metal 122 has pressed against the door foam 126 which, in turn, has pressed against the door trim 124. However, as a consequence of the presence of the decoupling cut-out area 128, the decoupled load path to the pelvis LPP has been lessened thus resulting in the pelvic acetabulum plug PP remaining either unmoved or minimally moved as the result of the impact.

The disclosed invention as set forth above overcomes the challenges faced by known vehicle door structures by reducing the impact upon a vehicle occupant in the event of a side impact. In addition, the advantage of the disclosed inventive concept also rests in its simplicity in manufacturing, cost efficiency over other solutions and its generic applicability to different vehicle programs. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A vehicle door for providing protection to a vehicle occupant during a side impact event, the door comprising:
    an outer door sheet-metal;
    an inner door sheet-metal attached to said outer door sheet-metal, said inner door sheet-metal having a decoupled load path defined by a cut-out area, said cut-out area being a slot; and
    a door beam.

2. The vehicle door of claim 1 further including a stiffening bead formed on said inner sheet-metal adjacent said cut-out area.

3. The vehicle door of claim 1 further including a seal substantially fitted over said cut-out area.

4. The vehicle door of claim 1 wherein said cut-out area is close-ended.

5. The vehicle door of claim 1 wherein said cut-out area is open-ended.

6. The vehicle door of claim 1 further including a door spacer block positioned substantially between said door beam and said inner sheet-metal.

7. The vehicle door of claim 6 wherein said door spacer block is composed of a polymerized material.

8. The vehicle door of claim 1 wherein said slot is elongated.

* * * * *